(12) United States Patent
Li et al.

(10) Patent No.: US 9,509,641 B1
(45) Date of Patent: Nov. 29, 2016

(54) MESSAGE TRANSMISSION FOR DISTRIBUTED COMPUTING SYSTEMS

(71) Applicant: International Business Machines Corporation, Armonk, NY (US)

(72) Inventors: Yong Zheng Li, Beijing (CN); Wei Wu, Beijing (CN); Rong Xiang, Beijing (CN); Wangli Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/967,731

(22) Filed: Dec. 14, 2015

(51) Int. Cl.
*G06F 15/173* (2006.01)
*H04L 12/861* (2013.01)

(52) U.S. Cl.
CPC ................................ *H04L 49/9089* (2013.01)

(58) Field of Classification Search
CPC .................................................. H04L 49/9089
USPC ........................ 709/213; 711/3, 206; 702/70
See application file for complete search history.

(56) References Cited

U.S. PATENT DOCUMENTS

| | | | |
|---|---|---|---|
| 7,158,480 B1 | 1/2007 | Firoiu et al. | |
| 8,072,887 B1 | 12/2011 | Siva et al. | |
| 8,081,644 B2 | 12/2011 | Schliwa-Bertling et al. | |
| 2002/0078271 A1* | 6/2002 | Berry | G06F 13/385 710/36 |
| 2003/0033431 A1* | 2/2003 | Shinomiya | G06F 12/1027 709/245 |
| 2003/0163647 A1* | 8/2003 | Cameron | G06F 12/1441 711/138 |
| 2004/0030763 A1* | 2/2004 | Manter | H04L 41/082 709/223 |
| 2004/0054837 A1* | 3/2004 | Biran | G06F 13/4022 710/305 |
| 2004/0186673 A1* | 9/2004 | Agoston | G01R 13/0227 702/70 |
| 2005/0144402 A1* | 6/2005 | Beverly | G06F 12/1475 711/152 |
| 2005/0207407 A1* | 9/2005 | Baumberger | H04L 49/90 370/389 |
| 2006/0004941 A1* | 1/2006 | Shah | G06F 12/1027 711/3 |
| 2009/0070448 A1* | 3/2009 | Pearson | H04L 29/12264 709/223 |
| 2009/0172324 A1* | 7/2009 | Han | G11B 20/1816 711/162 |
| 2009/0210592 A1* | 8/2009 | Hoover | G06F 13/4027 710/105 |
| 2011/0023029 A1* | 1/2011 | Diab | G06F 9/5077 718/1 |
| 2011/0310739 A1* | 12/2011 | Aybay | H04L 47/10 370/235 |
| 2011/0320709 A1* | 12/2011 | Han | G06F 3/061 711/114 |

OTHER PUBLICATIONS

Apple, "Apple Push Notification Service," https://developer.apple.com/library/ios/documentation/NetworkingInternet/Conceptual/RemoteNotificationsPG/Chapters/ApplePushService.html, Printed on Aug. 19, 2015, Copyright 2015, Apple Inc., pp. 1-10.

(Continued)

*Primary Examiner* — Thuong Nguyen
(74) *Attorney, Agent, or Firm* — Erik K. Johnson

(57) ABSTRACT

A message from a source computer that includes message information indicating a destination target computer system to receive the message, is received. The received message in a storage component, is stored. An entry to a virtual queue for the received message, wherein the entry in the virtual queue points to a memory address of the received message that is stored in the message component, is created. Responsive to determining that the destination target computer system is available, the received message to a physical queue component and assigning an expiration condition to the received message is enqueued. The enqueued message to the destination target computer system is transmitted. Responsive to determining that the expiration condition for the received message is met, the received message from the physical queue is removed.

11 Claims, 5 Drawing Sheets

(56) References Cited

OTHER PUBLICATIONS

Google, "Engage your users across Android, iOS and Chrome," Cloud Messaging, Google Developers, https://developers.google.com/cloud-messaging/, Last Updated Jul. 24, 2015, Printed on Aug. 19, 2015, pp. 1-2.

Mell et al., "The NIST Definition of Cloud Computing," National Institute of Standards and Technology, U.S. Department of Commerce, Special Publication 800-145, Sep. 2011, pp. 1-7.

* cited by examiner

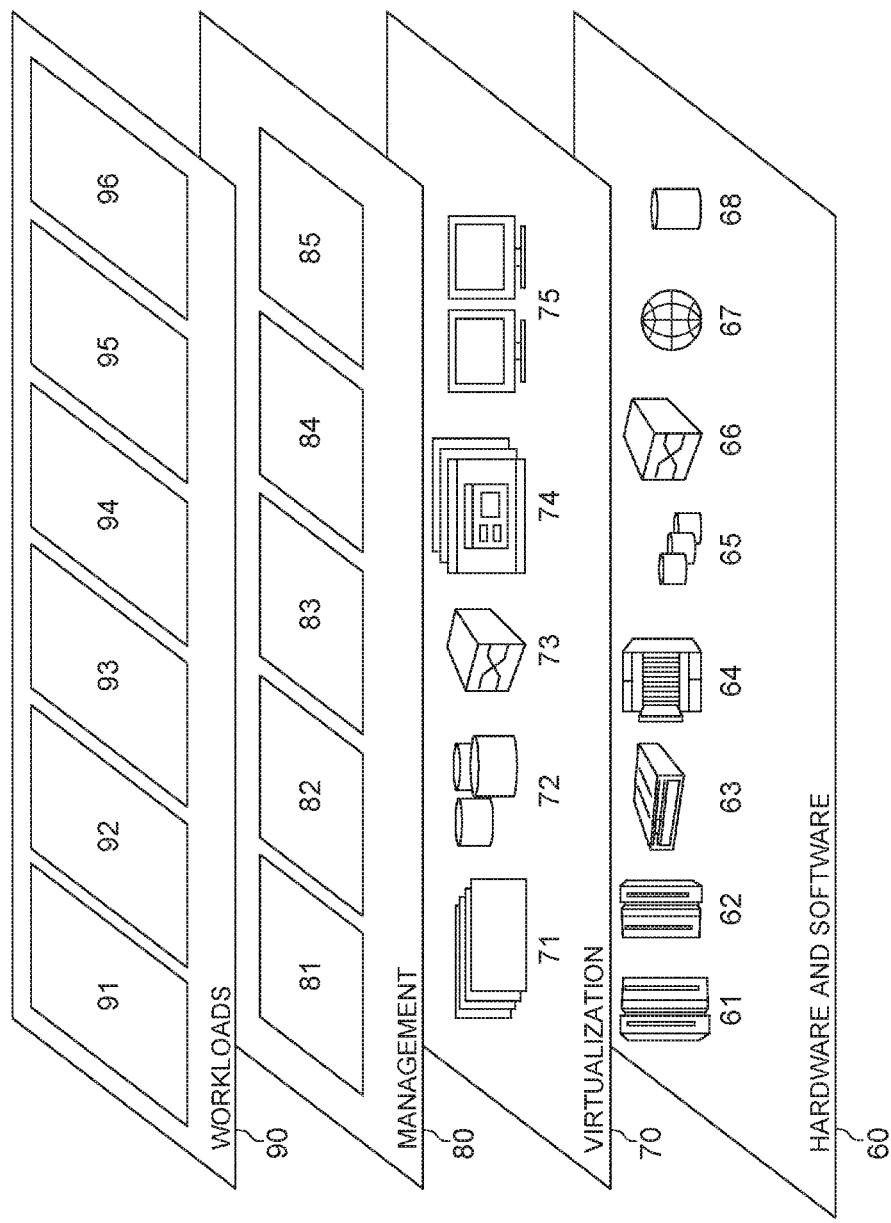

MESSAGE TRANSMISSION FOR DISTRIBUTED COMPUTING SYSTEMS

BACKGROUND OF THE INVENTION

The present invention relates generally to the field of transmitting messages for distributed computing system, and more particularly to message queueing in middleware computing systems that are implemented in unreliable networks, such as a mobile network or an Internet of Things (IoT) network.

SUMMARY

Embodiments of the present invention disclose a method, a computer system, and computer program products. A message from a source computer that includes message information indicating a destination target computer system to receive the message, is received. The received message in a storage component, is stored. An entry to a virtual queue for the received message, wherein the entry in the virtual queue points to a memory address of the received message that is stored in the message component, is created. Responsive to determining that the destination target computer system is available, the received message to a physical queue component and assigning an expiration condition to the received message is enqueued. The enqueued message to the destination target computer system is transmitted. Responsive to determining that the expiration condition for the received message is met, the received message from the physical queue is removed.

BRIEF DESCRIPTION OF THE DRAWINGS

FIG. 5 depicts abstraction model layers, in accordance with an embodiment of the present invention.

DETAILED DESCRIPTION

Figure 1:
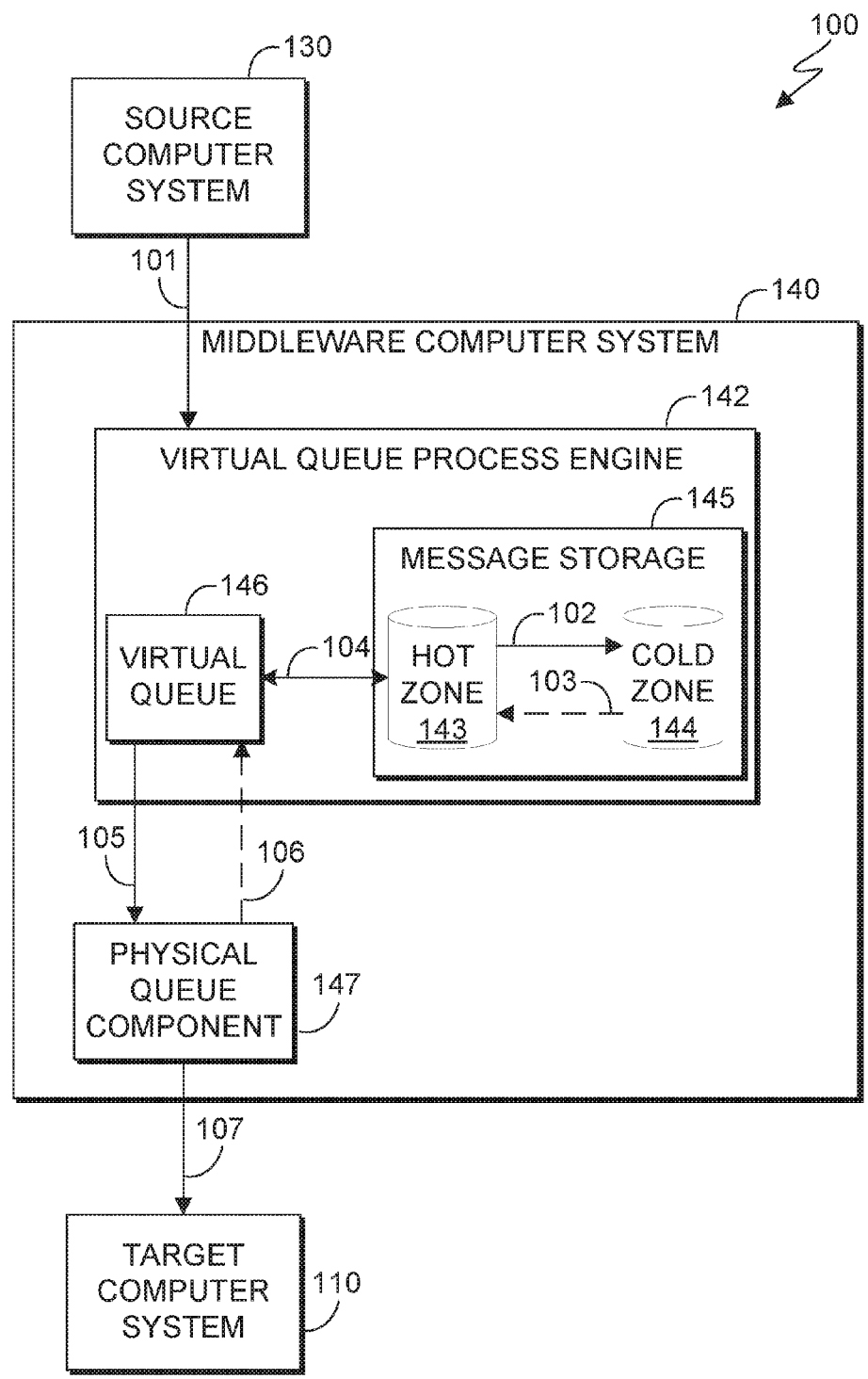
FIG. 1 is a block diagram of a distributed computing environment, in accordance with an embodiment of the present invention.

A number of computer systems can be connected to a network, such as a mobile network, to exchange messages. One measure of reliability may be the ability of the network to guarantee delivery of data between computer systems connected to the network, and to not accumulate messages that are in transit. A network may become less reliable, based on an increasing number of the computer systems connected to the network and varying behaviors of the users of the computer systems, resulting in message accumulation and blocking transportation of messages that are in transit. For example, in a server push based communication service, where a request for a given transaction, such as transmission of a message, is initiated by a publisher or server computer system, messages that are in transit may be accumulated at a rapid rate and affect message transportation if a large number of target computer systems identified to receive the messages are not connected to the network or are unavailable.

Message-oriented Middleware (MoM) is a software or hardware infrastructure that supports sending and receiving messages between computer systems that are connected to a network in a distributed computing environment. An MoM computer system can be implemented in a distributed computing environment to provide a communications layer which manages network interfaces, network protocols, operating systems, and other functions of heterogeneous computer systems of the distributed computing environment. Typically, the physical queue component of an MoM computer system handles queueing and transportation of messages to target computer systems identified to receive the messages of the distributed computing environment. The physical queue component of an MoM computer system can accumulate messages, and in some instances, messages in the queue may not successfully send to target computer systems identified to receive the messages. For example, a source computer system, such as a publisher or a server computer system, in a server push based communication service, can initiate transmission of a message to a number of target computer systems over a network in a distributed computing environment. The source computer system can send the message to an MoM computer system that queues the message in a physical queue component and is transmitted once one or more of the number of target computer systems are connected to the network or are available.

A virtual queue process engine can be implemented in an MoM computer system to reduce potential message accumulation in a physical queue component of the MoM computer system. One virtual queue in the virtual queue process engine may be associated with one target computer system of the distributed computing environment. Storage media for the virtual queue process engine can be used by each virtual queue to store messages in a message database. Messages can be transported bi-directionally between the storage media, based on various conditions and properties of the messages. After the MoM computer system determines that a message is ready to be transmitted to a target computer system that is identified to receive the message, then the message can be queued to the physical queue component of the MoM computer system such that the physical queue component can transmit the message to the respective target computer system.

Embodiments of the present invention provide systems, methods, and computer program products for transporting messages in distributed computing environments that are deployed in an unreliable network. Embodiments of the present invention manage expiration conditions for messages to reduce message accumulation in middleware computer systems that are implemented in distributed computing environments.

FIG. 1 is a functional block diagram of a distributed computing environment 100, in accordance with an embodiment of the present invention. Distributed computing environment 100 includes target computer system 110, source computer system 130, and middleware computer system 140, which are all connected via a network. Target computer system 110, source computer system 130, and middleware computer system 140 can be desktop computers, laptop computers, specialized computer servers, or any other computer systems known in the art, in accordance with an embodiment of the present invention. In certain embodiments, target computer system 110, source computer system 130, and middleware computer system 140 represent computer systems utilizing clustered computers and components to act as a single pool of seamless resources when accessed through network 120. In general, target computer system 110, source computer system 130, and middleware computer system 140 are representative of any electronic devices or combination of electronic devices, capable of executing machine-readable program instructions in accordance with an embodiment of the present invention, as described in greater detail with regard to FIG. 4. In other embodiments, target computer system 110, source computer system 130, and middleware computer system 140 may be implemented in a cloud computing environment, as described in greater detail with regard to FIGS. 5 and 6.

In this embodiment, communication channels 101-107 are presented in FIG. 1, which represent interactions between components of distributed computing environment 100, such as receiving, handling, and transmitting a message. It should be understood that, communication channels 103 and 106 are conditional communication channels and may occur in certain embodiments of the present invention.

Source computer system 130 represents a platform that sends messages to target computer system 110 that is connected to a network. In this embodiment, source computer system 130 includes an application programming interface (API) that is used to communicate with middleware computer system 140, as described in greater detail below. For example, the API of source computer system 130 can issue a command to enqueue a message to be handled by middleware computer system 140 and components therein. In this embodiment, a message transmitted from source computer system 130 to virtual queue process engine 142 (communication channel 101) of middleware computer system 140.

Target computer system 110 represents a platform that receives messages originating from source computer system 130. In this embodiment, target computer system 110 includes an API used to communicate with middleware computer system 140, as described in greater detail below. For example, the API of target computer system 110 can issue a command to dequeue a message handled by middleware computer system 140 and components therein. In this embodiment, if target computer system 110 is connected to a network and available to receive a message, then target computer system 110 is considered available. For example, if network resources, computational resources, and/or storage resources for target computer system 110 are not be available, then target computer system 110 cannot receive a message until target computer system 110 is available. In one embodiment, target computer system 110 can transmit a confirmation receipt to components of middleware computer system 140, indicating that a message delivered from middleware computer system 140 and components therein has been successfully received by target computer system 110.

Middleware computer system 140 represents a platform that supports sending and receiving of messages between target computer system 110 and source computer system 130. In this embodiment, middleware computer system 140 includes virtual queue process engine 142 and physical queue component 147. Middleware computer system 140 can be part of an MoM computer system that manages transportation of messages asynchronously. Middleware computer system 140 can provide an asynchronous message delivery service, such that source computer system 130 and target computer system 110 do not need to connect to a network at a same time.

Virtual queue process engine 142 is logic or a module of middleware computer system 140 that performs message handling. Virtual queue process engine 142 operates generally to create a virtual queue, such as virtual queue 146, for each target computer system 110 that is available. Virtual queue 146 represents a data structure that may include an initialized data structure, such as a struct, along with pointers that point to memory addresses of message storage 145 that contain received messages and message information. For example, once target computer system 110 becomes available, virtual queue process engine 142 may enqueue a message to virtual queue 146 (communication channel 104). As messages are received by middleware computer system 140, virtual queue process engine 142 manages bi-directional movement of received messages between physical queue component 147 and virtual queue 146 (communication channels 105 and 106), manages a message expiration process (communication channels 106 and 104), and manages movement of received messages between hot zone 143 and cold zone 144 (communication channels 102 and 103).

An expiration process may involve determining whether a message enqueued in physical queue component 147 meets an expiration condition. For example, the expiration condition can be calculated by determining whether a time out value is exceeded by a time difference between when a message is first enqueued in physical queue component 147 and when a confirmation is received by virtual queue process engine 142 indicating that target computer system 110 received the message. If the calculated time difference for the message exceeds the specified time out value, then the message enqueued in physical queue component 147 is expired. An expiration condition is implemented to ensure that messages which have been enqueued in physical queue component 147 at an earlier time (e.g., "old" messages) are not consuming additional computational, network, storage, and/or 110 resources provided by physical queue component 147, which may result in message accumulation in physical queue component 147.

Physical queue component 147 represents another data structure that is used by middleware computer system 140 to dispatch messages which are identified for delivery to target computer system 110, as described in greater detail below. In one embodiment, virtual queue process engine 142 can transmit messages which are identified for delivery from virtual queue 146 to physical queue component 147, based on various conditions (communication channel 105). For example, one of the conditions may involve determining an accumulation status of messages or a message expiration status, as described in greater detail below. In certain embodiments, a message can expire in physical queue component 147, which results in virtual queue process engine 142 to perform message handling to dequeuing the message from physical queue component 147 and enqueuing the message to virtual queue 146 (communication channel 106). Accordingly, once target computer system 110 is available, and a received message is enqueued in physical queue component 147, middleware computer system 140 can successfully dispatch the message to an intended recipient, such as target computer system 110 (communication channel 107).

Message storage 145 includes two storage media, hot zone 143 and cold zone 144. Message storage 145 can include one or more data structures, such as message tables, containing messages received by middleware computer system 140 and message information for the received messages. As previously discussed, virtual queue process engine 142 can use virtual queue 146 to reference information stored in message storage 145 during message handling via pointers.

Hot zone 143 represents a storage medium, such as a high speed read/write storage medium. In this embodiment, virtual queue process engine 142 stores received messages in hot zone 142 based on parameters of the messages, such as a size of the message, an idle time of the message, and speed of consumption of the message. For example, virtual queue process engine 142 can store messages in hot zone 143 by default, and move the received message from hot zone 143 to cold zone 144 if the received message is stored in hot zone 143 longer than a specified time duration. In certain embodiments, hot zone 143 may reach a memory threshold, where subsequent messages received by virtual queue process engine 142 cannot be stored in hot zone 143 because of a sufficient number of storage resources are not available in hot zone 143. Commands can be issued by API's of source computer system 130 and target computer system 110, such that messages can be retrieved from, or stored to, hot zone 143 or cold zone 144.

Cold zone 144 represents a storage medium, such as a persistent disk storage medium, that can be part of a storage repository for virtual queue process engine 142. In this embodiment, virtual queue process engine 142 designates messages to be stored in cold zone based on parameters of the messages, as previously described. In this embodiment, virtual queue process engine 142 prioritizes storing messages in hot zone 142 rather cold zone 144, which can reduce a time duration associated with a processing time of middleware computer system 140 for handling the designated messages. In certain embodiments, API's of source computer system 130 and target computer system 110 can issue a command, such as GET call, to retrieve a message stored in cold zone 144. Virtual queue process engine 142 permanently stores the message in cold zone 144 (communication channel 102), before enqueuing the message to physical queue component 147 (communication channel 105). In certain embodiments, a memory threshold of hot zone 143 is reached, and virtual queue process engine 142 can only store the message in cold zone 144. In this instance, prior to queueing the message to virtual queue 146, virtual queue process engine 142 may move a storage location for the message from cold zone 144 to hot zone 143 (communication channel 103) once a sufficient number of storage resources are available for hot zone 143. Accordingly, virtual queue process engine 142 manages a bi-directional movement of a message between hot zone 143 and cold zone 144.

Figure 2:
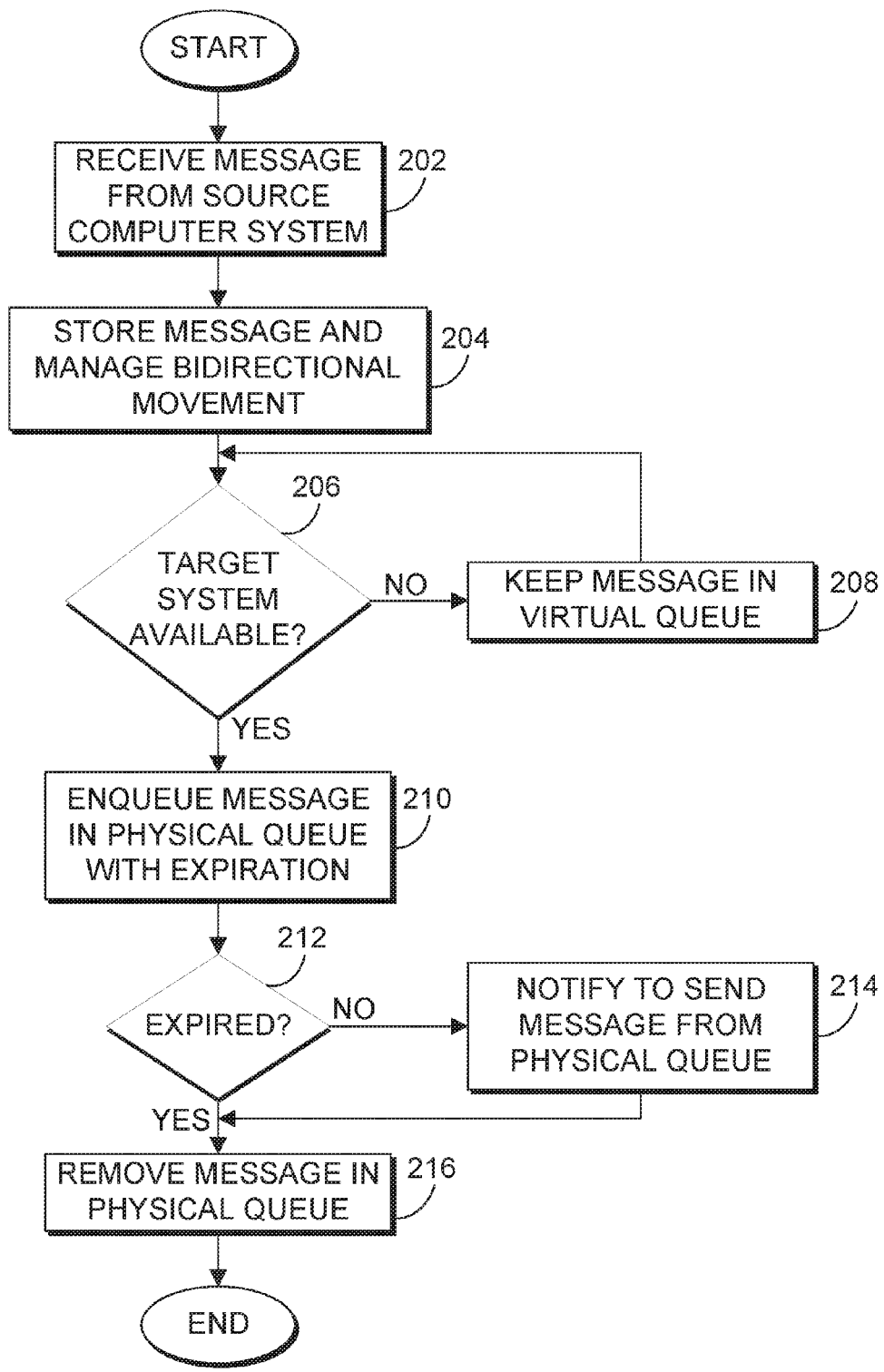
FIG. 2 is a flowchart illustrating operational steps for sending a message using a virtual queue process engine, in accordance with an embodiment of the present invention.

FIG. 2 is a flowchart illustrating operational steps for sending a message using virtual queue process engine 142, in accordance with an embodiment of the present invention.

Virtual queue process engine 142 receives a message from source computer system 130 (step 202). Virtual queue process engine 142 then stores the received message in message storage 145 and manages bi-directional movement of the received message between hot zone 143 and cold zone 144 (step 204). In this embodiment, once virtual queue process engine 142 stores the received message in message storage 145, virtual queue 146 maintain entries for enqueued messages that point to memory addresses of messages stored in message storage 145. As previously described, each target computer system 110 that is designated to receive the message originating from source computer system 130 is associated with a unique virtual queue 146. Virtual queue process engine 142 determines whether target computer system 110 becomes available (decision 206). For example, target computer system 110 may notify virtual queue process engine 142 when target computer system 110 is available. If, virtual queue process engine 142 determines that target computer system 110 is not available ("no" branch, decision 206), then virtual queue process engine 142 keeps the received message in virtual queue 146 (step 208). For example, virtual queue process engine 142 may keep the received message in virtual queue 146 until target computer system 110 becomes available.

If, virtual queue process engine 142 determines that target computer system 110 is available ("yes" branch, decision 206), then virtual queue process engine 142 enqueues the message in physical queue component 147 and assigns an expiration condition to the enqueued message (step 210). As previously described, the expiration condition can calculated by determining whether a time out value is exceeded by a time difference between when a message is first enqueued in physical queue component 147 and when a confirmation is received by virtual queue process engine 142 indicating that target computer system 110 received the message. Virtual queue process engine 142 determines whether the enqueued message is expired (decision 212). If, virtual queue process engine 142 determines that the enqueued message is not expired ("no" branch, decision 212), then virtual queue process engine 142 notifies middleware computer system 140 and components therein to send the enqueued message from physical queue component 147 to target computer system 110 (step 214). In this embodiment, virtual queue process engine 142 receives a confirmation from target computer system 110 indicating that the message sent from physical queue component 147 has been successfully received by target computer system 110. In this instance, virtual queue process engine 142 can remove the message from physical queue component 147, responsive to virtual queue process engine 142 receiving the confirmation (step 216). If a confirmation is not received by virtual queue process engine 142, then if, virtual queue process engine 142 determines that the enqueued message is expired ("yes" branch, decision 212), then virtual queue process engine 142 removes the expired message from physical queue component 147 (step 216). In this embodiment, virtual queue process engine 142 maintains pointers for expired message in virtual queue 146 that point to the expired message stored in message storage 145. If a confirmation is received by virtual queue process engine 142, then the entry for the successfully transmitted message that is maintained by virtual queue 146 is removed.

Figure 3:
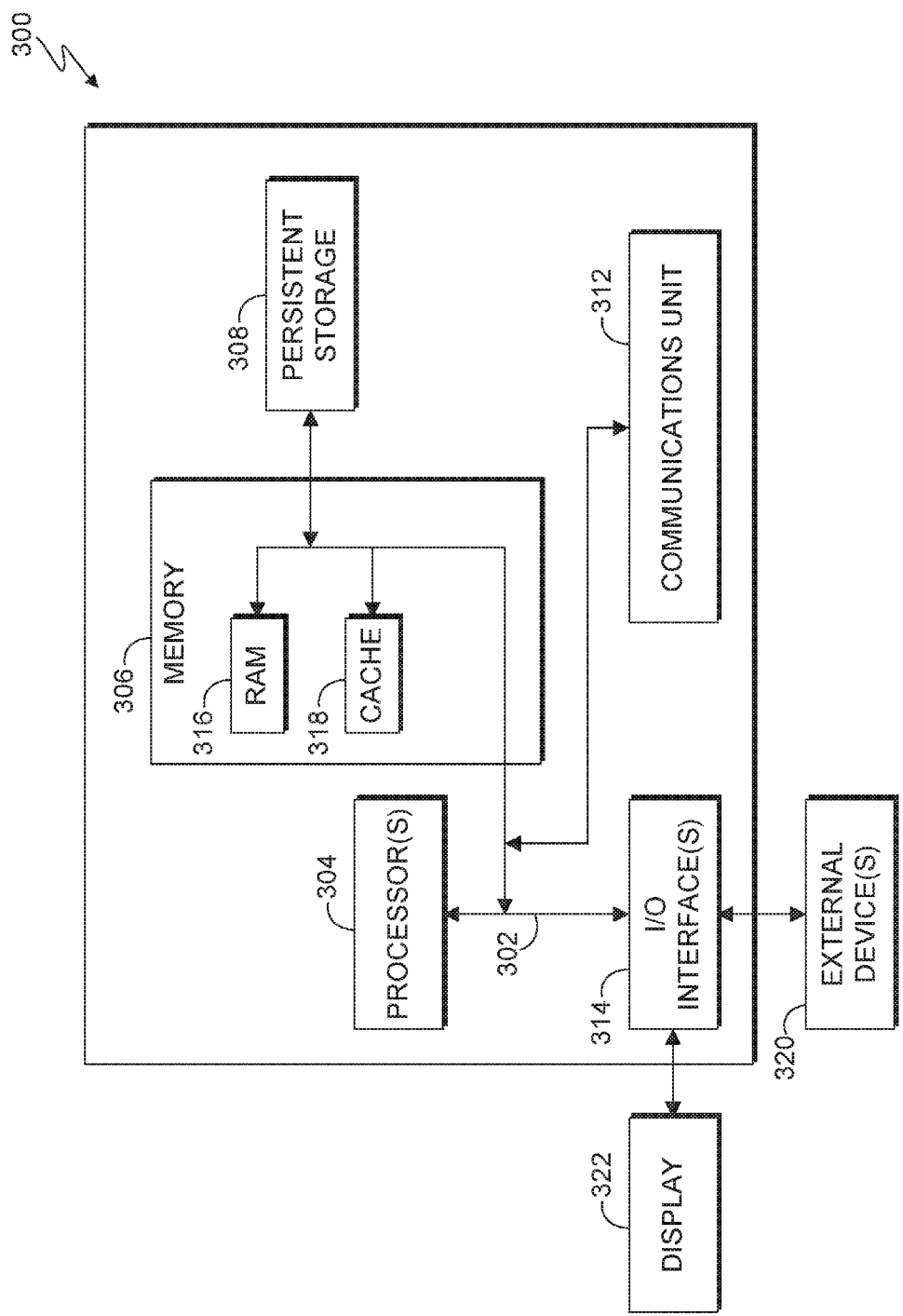
FIG. 3 is a block diagram of internal and external components of the computer systems of FIG. 1, in accordance with an embodiment of the present invention.

FIG. 3 is a block diagram of internal and external components of a computer system 300, which is representative the computer systems of FIG. 1, in accordance with an embodiment of the present invention. It should be appreciated that FIG. 3 provides only an illustration of one implementation and does not imply any limitations with regard to the environments in which different embodiments may be implemented. In general, the components illustrated in FIG. 3 are representative of any electronic device capable of executing machine-readable program instructions. Examples of computer systems, environments, and/or configurations that may be represented by the components illustrated in FIG. 3 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 300 includes communications fabric 302, which provides for communications between one or more processors 304, memory 306, persistent storage 308, communications unit 312, and one or more input/output (I/O) interfaces 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media. Software is stored in persistent storage 308 for execution and/or access by one or more of the respective processors 304 via one or more memories of memory 306.

Persistent storage 308 may include, for example, a plurality of magnetic hard disk drives. Alternatively, or in addition to magnetic hard disk drives, persistent storage 308 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computer-readable storage medium that is also part of persistent storage 308.

Communications unit 312 provides for communications with other computer systems or devices via a network. In this exemplary embodiment, communications unit 312 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 312 (e.g., via the Internet, a local area network or other wide area network). From communications unit 312, the software and data can be loaded onto persistent storage 408.

One or more I/O interfaces 314 allow for input and output of data with other devices that may be connected to computer system 300. For example, I/O interface 314 can provide a connection to one or more external devices 320, such as a keyboard, computer mouse, touch screen, virtual keyboard, touch pad, pointing device, or other human interface devices. External devices 320 can also include portable computer-readable storage media such as, for example, thumb drives, portable optical or magnetic disks, and memory cards. I/O interface 314 also connects to display 322.

Display 322 provides a mechanism to display data to a user and can be, for example, a computer monitor. Display 322 can also be an incorporated display and may function as a touch screen, such as a built-in display of a tablet computer.

Figure 4:
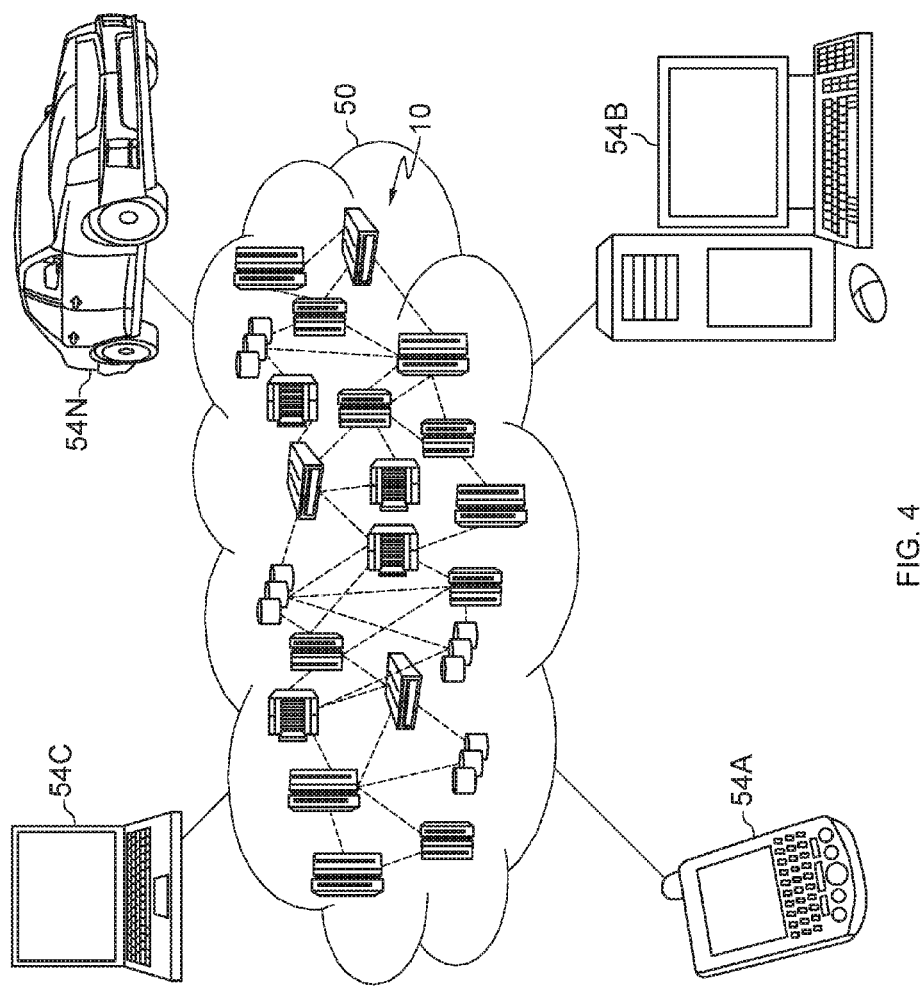
FIG. 4 depicts a cloud computing environment, in accordance with an embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and distributed computing environment 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for message queuing in a message-oriented middleware computer implemented in a distributed computing environment including a source computer and a plurality of target computers connected by a network, the method comprising:

receiving, by one or more computer processors in a message-oriented middleware computer, a message from a source computer including message information indicating that a target computer is designated to receive the message;

storing, by the one or more computer processors, the message in a non-transitory high speed computer readable storage medium of the message-oriented middleware computer configured for high speed read and write operations, wherein the message-oriented middleware computer includes the non-transitory high speed computer readable storage medium and a non-transitory low speed computer readable storage medium;

creating, by the one or more computer processors, an entry in a virtual queue associated with the target computer for the message, wherein a pointer address of the entry points to a memory address of the message stored in the non-transitory high speed computer readable storage medium, and wherein each of the plurality of target computers is associated with a respective unique virtual queue;

responsive to determining that the target computer is available to receive the message over the network:

enqueuing, by the one or more computer processors, the message to a physical queue component;

transmitting, by the one or more computer processors, the message from the physical queue component to the target computer;

moving, by the one or more computer processors, the message from the non-transitory high speed computer readable storage medium to the non-transitory low speed computer readable storage medium, and updating the pointer address of the entry in the virtual queue to point to a memory address of the message stored in the non-transitory low speed computer readable storage medium;

responsive to receiving a confirmation of message receipt from the target computer within a specified time, removing, by the one or more computer processors, the message from the physical queue component, removing the message from the non-transitory low speed computer readable storage medium, and removing the entry for the message in the virtual queue; and responsive to not receiving the confirmation of message receipt from the target computer within the specified time, removing, by the one or more computer processors, the message from the physical queue component, indicating in the entry of the virtual queue that the confirmation of message receipt was not received from the target computer within the specified time, and wherein the message remains in the non-transitory low speed computer readable storage medium.

2. The method of claim 1, further comprising:

responsive to not receiving the confirmation of message receipt from the target computer within the specified time, determining, by the one or more computer processors, whether the target computer is available to receive the message over the network.

3. The method of claim 1, further comprising:

responsive to determining that the message stored in the non-transitory high speed computer readable storage medium exceeds a specified time duration, moving, by the one or more computer processors, a storage location for the message from the non-transitory high speed computer readable storage medium to the non-transitory low speed computer readable storage medium, and updating the pointer address of the entry in the virtual queue to point to a memory address of the message stored in the non-transitory low speed computer readable storage medium; and responsive to determining that the non-transitory high speed computer readable storage medium does not have available storage resources to store the message, storing, by the one or more computer processors, the message in the non-transitory low speed computer readable storage medium, and pointing the pointer address of the entry in the virtual queue to a memory address of the message stored in the non-transitory low speed computer readable storage medium.

4. The method of claim 1, wherein the specified time for receiving the confirmation of message receipt from the target computer is determined by a time difference between a time when the message is first enqueued in the physical queue component and a time when the confirmation of message receipt is received from the target computer.

5. A computer program product for message queuing in a message-oriented middleware computer implemented in a distributed computing environment including a source computer and a plurality of target computers connected by a network, the computer program product comprising: one or more non-transitory computer readable storage media and program instructions stored on the one or more non-transitory computer readable storage media, the program instructions comprising:

program instructions to receive a message from a source computer including message information indicating that a target computer is designated to receive the message;

program instructions to store the message in a non-transitory high speed computer readable storage medium of the message-oriented middleware computer configured for high speed read and write operations, wherein the message-oriented middleware computer includes the non-transitory high speed computer readable storage medium and a non-transitory low speed computer readable storage medium;

program instructions to create an entry in a virtual queue associated with the target computer for the message, wherein a pointer address of the entry points to a memory address of the message stored in the non-transitory high speed computer readable storage medium, and wherein each of the plurality of target computers is associated with a respective unique virtual queue;

program instructions to, responsive to determining that the target computer is available to receive the message over the network:

program instructions to enqueue the message to a physical queue component;

program instructions to transmit the message from the physical queue component to the target computer;

program instructions to move the message from the non-transitory high speed computer readable storage medium to the non-transitory low speed computer readable storage medium, and update the pointer address of the entry in the virtual queue to point to a memory address of the message stored in the non-transitory low speed computer readable storage medium;

program instructions to, responsive to receiving the confirmation of message receipt from the target computer within the specified time, remove the message from the physical queue component, remove the message from the non-transitory low speed computer readable storage medium, and remove the entry for the message in the virtual queue; and program instructions to, responsive to not receiving the confirmation of message receipt from the target computer within the specified time, remove the message from the physical queue component, indicate in the entry of the virtual queue that the confirmation of message receipt was not received from the target computer within the specified time, and wherein the message remains in the non-transitory low speed computer readable storage medium.

6. The computer program product of claim 5, wherein the program instructions stored on the one or more non-transitory computer readable storage media further comprise:

program instructions to, responsive to not receiving the confirmation of message receipt from the target computer within the specified time, determine whether the target computer is available to receive the message over the network.

7. The computer program product of claim 5, wherein the program instructions stored on the one or more non-transitory computer readable storage media further comprise:

program instructions to, responsive to determining that the message stored in the non-transitory high speed computer readable storage medium exceeds a specified time duration, move a storage location for the message from the non-transitory high speed computer readable storage medium to the non-transitory low speed computer readable storage medium, and update the pointer address of the entry in the virtual queue to point to a memory address of the message stored in the non-transitory low speed computer readable storage medium; and program instructions to, responsive to determining that the non-transitory high speed computer readable storage medium does not have available storage resources to store the message, store the message in the non-transitory low speed computer readable storage medium, and point the pointer address of the entry in the virtual queue to a memory address of the message stored in the non-transitory low speed computer readable storage medium.

8. The computer program product of claim 5, wherein the specified time for receiving the confirmation of message receipt from the target computer is determined by a time difference between a time when the message is first enqueued in the physical queue component and a time when the confirmation of message receipt is received from the target computer.

9. A computer system for message queuing in a message-oriented middleware computer implemented in a distributed computing environment including a source computer and a plurality of target computers connected by a network, the computer system comprising:

one or more computer processors;
one or more non-transitory computer readable storage media;
program instructions stored on the one or more non-transitory computer readable storage media for execution by at least one of the one or more processors, the program instructions comprising:
program instructions to receive a message from a source computer including message information indicating that a target computer is designated to receive the message;
program instructions to store the message in a non-transitory high speed computer readable storage medium of the message-oriented middleware computer configured for high speed read and write operations, wherein the message-oriented middleware computer includes the non-transitory high speed computer readable storage medium and a non-transitory low speed computer readable storage medium;
program instructions to create an entry in a virtual queue associated with the target computer for the message, wherein a pointer address of the entry points to a memory address of the message stored in the non-transitory high speed computer readable storage medium, and wherein each of the plurality of target computers is associated with a respective unique virtual queue;
program instructions to, responsive to determining that the target computer is available to receive the message over the network:
program instructions to enqueue the message to a physical queue component;
program instructions to transmit the message from the physical queue component to the target computer;
program instructions to move the message from the non-transitory high speed computer readable storage medium to the non-transitory low speed computer readable storage medium, and update the pointer address of the entry in the virtual queue to point to a memory address of the message stored in the non-transitory low speed computer readable storage medium;

program instructions to, responsive to receiving the confirmation of message receipt from the target computer within the specified time, remove the message from the physical queue component, remove the message from the non-transitory low speed computer readable storage medium, and remove the entry for the message in the virtual queue; and program instructions to, responsive to not receiving the confirmation of message receipt from the target computer within the specified time, remove the message from the physical queue component, indicate in the entry of the virtual queue that the confirmation of message receipt was not received from the target computer within the specified time, and wherein the message remains in the non-transitory low speed computer readable storage medium.

10. The computer system of claim 9, wherein the program instructions stored on the one or more non-transitory computer readable storage media further comprise:

program instructions to, responsive to not receiving the confirmation of message receipt from the target computer within the specified time, determine whether the target computer is available to receive the message over the network.

11. The computer system of claim 9, wherein the program instructions stored on the one or more non-transitory computer readable storage media further comprise:

program instructions to, responsive to determining that the message stored in the non-transitory high speed computer readable storage medium exceeds a specified time duration, move a storage location for the message from the non-transitory high speed computer readable storage medium to the non-transitory low speed computer readable storage medium, and update the pointer address of the entry in the virtual queue to point to a memory address of the message stored in the non-transitory low speed computer readable storage medium; and program instructions to, responsive to determining that the non-transitory high speed computer readable storage medium does not have available storage resources to store the message, store the message in the non-transitory low speed computer readable storage medium, and point the pointer address of the entry in the virtual queue to a memory address of the message stored in the non-transitory low speed computer readable storage medium.

* * * * *